UNITED STATES PATENT OFFICE.

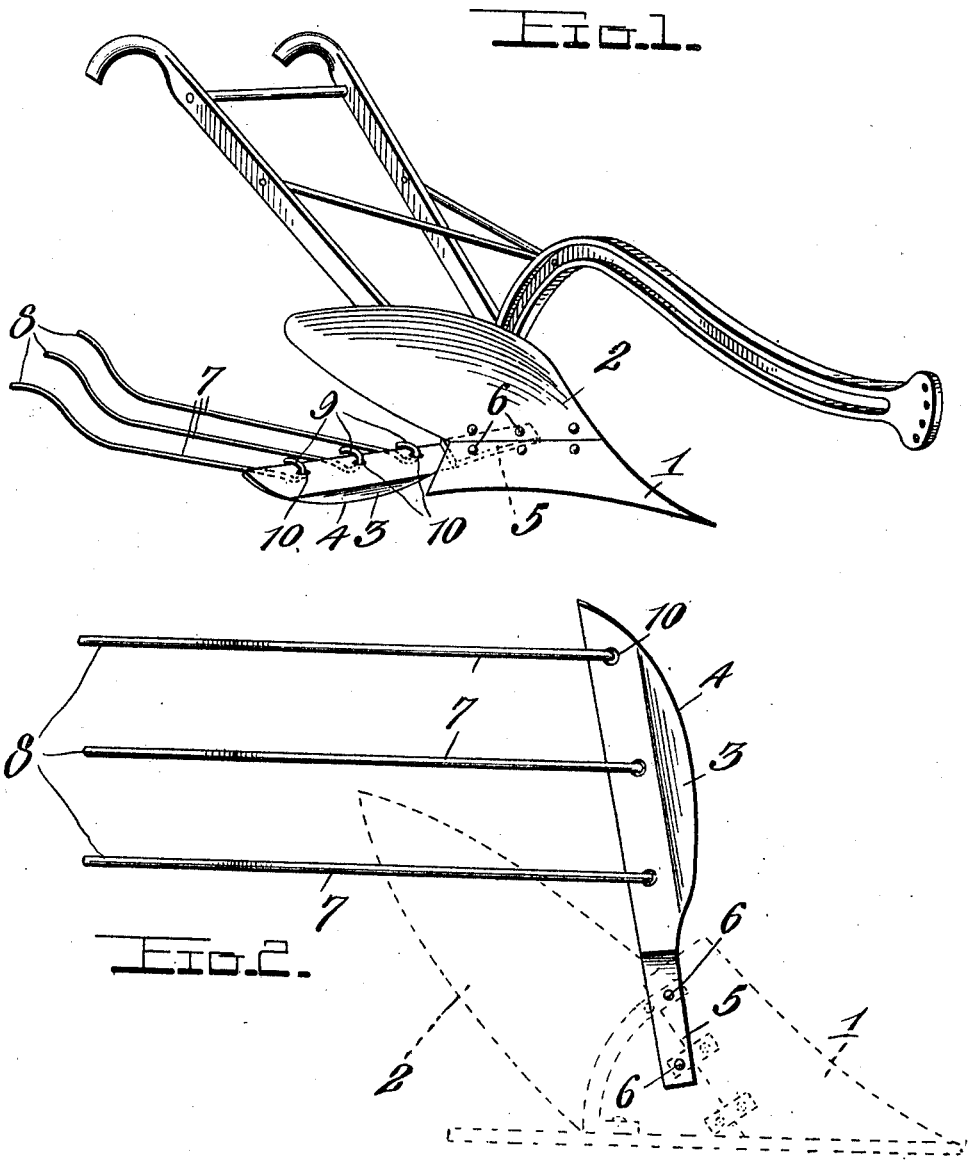

WILLIAM ADEN, OF SARATOGA, WYOMING.

PLOW ATTACHMENT.

978,259.

Specification of Letters Patent. Patented Dec. 13, 1910.

Application filed May 28, 1910. Serial No. 563,916.

*To all whom it may concern:*

Be it known that I, WILLIAM ADEN, a citizen of the United States, residing at Saratoga, in the county of Carbon and State of Wyoming, have invented certain new and useful Improvements in Plow Attachments, of which the following is a specification, reference being had to the accompanying drawings.

This invention relates to improvements in attachments for plows, and more particularly to a device adapted to trail through the loose earth turned by a plow, and to lift the brush, weeds, roots, etc. to the surface so that such brush may be conveniently gathered and burned or otherwise disposed of.

The object of the invention is to provide a simple and inexpensive attachment of this character which will effectively accomplish the intended purpose without materially increasing the draft on the animal or animals attached to the plow, and which while especially adapted for use in clearing sage brush off of land, may be used for clearing ground covered with other kinds of vegetation.

With the above and other objects in view, the invention consists of the novel construction, combination and arrangement of parts, hereinafter fully described and claimed, and illustrated in the accompanying drawing in which:—

Figure 1 is a perspective view of a plow showing the invention applied thereto. Fig. 2 is a bottom plan view of the attachment with portions of the plow indicated in dotted lines.

In the drawings 1 denotes the plowshare and 2 the mold-board of a plow adapted for plowing new ground, and to which my attachment is applied, although the invention may be used in connection with other kinds of plows than the one illustrated. The attachment comprises a blade 3 which is bolted or otherwise secured to the bottom of the share 1 and mold-board 2, as shown more clearly in Fig. 2. This blade is disposed in a substantially horizontal plane and extends outwardly and rearwardly, its front edge 4 being beveled or sharpened so that it will not materially increase the draft on the animals hitched to the plow. The inner or attached end of the blade 3 is preferably reduced and shaped to form an attaching shank 5 having openings to receive bolts or similar fastenings 6, whereby it is securely fastened to the plow. The outer portion of the blade 3 has loosely connected to it the forward ends of two or more trash-lifting rods 7 adapted to trail along through the ground overturned by the plow and adapted to elevate the roots and branches of sage brush, weeds, and other vegetable matter. Each of the rods 7 is formed from a single piece of metal of suitable size and has a straight forward portion and an upwardly and rearwardly curved rear portion 8, which latter is adapted to lift the vegetation to the surface of the ground. The forward ends of the rods 7 are bent to form hooks or eyes 9 which are arranged in vertical openings 10 formed in the blade 3 adjacent its rear edge. By constructing and arranging the rods 7 in this manner it will be seen they will trail along in rear of the blade 3 without greatly increasing the draft on the animals, and they will have free swinging movement in any direction so that they will not be bent or broken by rocks or other obstructions which may be in their path. Any number of the rods 7 may be employed but when the attachment is to be used to clear land of sage brush, I find that two will be sufficient, but when the land is covered with alfalfa and other lighter vegetation three or more of said rods may be employed.

From the foregoing it will be seen that the simple construction of the device enables it to be produced at a small cost and readily applied to various kinds of plows, and also to various sizes of plows, although I prefer to make the attachments in different sizes, according to the size of the plows on which they are to be used. By loosely mounting the rods as set forth on the horizontally arranged and rearwardly and outwardly extended cutting blade 3, and making the rods with the rearwardly and upwardly curved deflecting portions 8, I find that the device will only slightly increase the draft and will effectively raise to the surface of the ground all roots, stalks, etc., of sage brush and other vegetation.

What is claimed is:

The combination with an ordinary plow, of a substantially horizontal blade having a reduced inner end forming a shank secured to the bottom of the mold board of the plow, the main portion of the blade projecting laterally from the plow and inclined rearwardly, the front edge of the blade being rounded and beveled to a cutting edge, and the rear thick portion of the blade being formed with a longitudinal series of vertical openings, a series of independent rods arranged in spaced parallel relation and having straight body portions provided with upwardly and rearwardly curved rear ends, the front ends of said rods being bent to form upwardly and rearwardly turned hooks, the latter being loosely connected in the vertical openings of the rear portion of the blade whereby said rods are loosely connected to the blade for independent vertical and horizontal movement.

In testimony whereof I hereunto affix my signature in the presence of two witnesses.

WILLIAM ADEN.

Witnesses:
PAUL DOGGETT,
J. F. CRAWFORD.